United States Patent [19]
Kettner et al.

[11] 4,138,468
[45] Feb. 6, 1979

[54] METHOD AND APPARATUS FOR PRODUCING OR RECOVERING ALKANOLAMINE FROM A MIXTURE CONTAINING OXAZOLIDONE

[75] Inventors: Roland Kettner, Heist; Herbert Unland, Nienhagen, both of Fed. Rep. of Germany

[73] Assignee: Mobil Oil Corporation, New York, N.Y.

[21] Appl. No.: 781,237

[22] Filed: Mar. 25, 1977

[30] Foreign Application Priority Data

Oct. 5, 1976 [DE] Fed. Rep. of Germany ....... 2645251

[51] Int. Cl.² .................... B01D 53/34; C07C 91/04
[52] U.S. Cl. .................................. 423/228; 423/229; 260/584 R
[58] Field of Search .................. 423/226, 228, 229; 260/584 C, 584 R

[56] References Cited

U.S. PATENT DOCUMENTS

| | | | |
|---|---|---|---|
| 2,812,333 | 11/1957 | Steek | 260/584 X |
| 2,847,418 | 8/1958 | Steek | 260/584 X |
| 3,266,866 | 8/1966 | Bally et al. | 423/229 |
| 3,338,664 | 8/1966 | Bally et al. | 423/223 |
| 3,347,621 | 10/1967 | Papadopoulos et al. | 423/226 |
| 3,658,462 | 4/1972 | Van Scoy | 423/228 X |

*Primary Examiner*—Earl C. Thomas
*Attorney, Agent, or Firm*—C. A. Huggett; Henry L. Ehrlich

[57] ABSTRACT

This specification discloses a method and apparatus for producing and recovering alkanolamine from a mixture containing oxazolidone by hydrolyzing the mixture containing oxazolidone.

17 Claims, 9 Drawing Figures

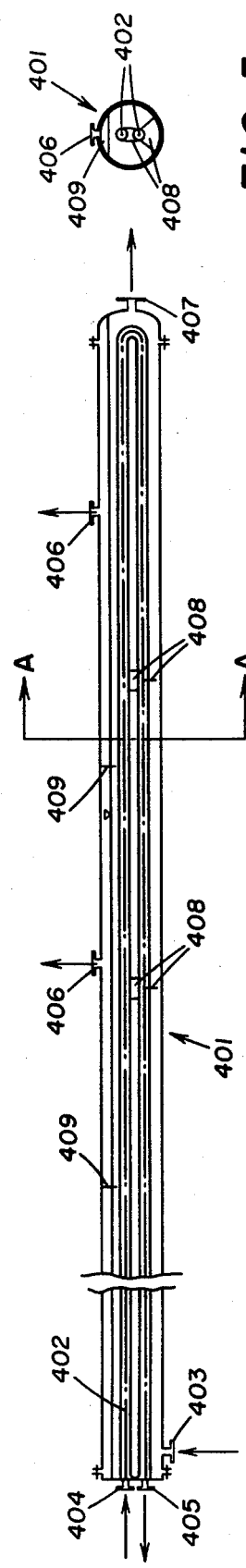

METHOD AND APPARATUS FOR PRODUCING OR RECOVERING ALKANOLAMINE FROM A MIXTURE CONTAINING OXAZOLIDONE

BACKGROUND OF THE INVENTION

The invention relates to a method and apparatus for regenerating alkanolamine from a mixture containing oxazolidone.

To remove acidic gases such as carbon dioxide ($CO_2$), hydrogen sulfide ($H_2S$), carbonyl sulfide (COS), and the like, from gaseous mixtures there are employed absorption solutions containing alkanolamines. In the absorption process the alkanolamine of the absorption solution reacts with the carbon dioxide of the gaseous mixture to form carbonate, carbamate, and bicarbonate. In the regenerating of the loaded absorption solution there are applied elevated temperatures and pressures which are kept as low as possible. This results in the removal of the acidic gases from the absorption solution and reformation or regeneration of the free alkanolamine. However, under the conditions prevailing during the regenerating process some of the carbamate reacts irreversibly with the result that an oxazolidone derivative is formed. Thus, free alkanolamine is lost and the absorbing capacity of the solution is reduced. The reaction product oxazolidone concentrates in the circulating absorption solution and separation thereof becomes necessary. The oxazolidone derivative is a waste product. Therefore, fresh alkanolamine in an amount corresponding to the oxazolidone has to be fed to the plant.

There is a method of absorbing acidic components from gases described in U.S. Pat. No. 3,658,462 wherein, with a view to recovering the alkanolamine, those reaction products of the absorption process which are not regenerative are contacted with caustic and a sufficient amount of water is withdrawn from the reaction mixture to decompose the reaction mixture into an alkanolamine portion and a salt portion in aqueous solution. The decomposition, by addition of caustic, oxazolidone into alkanolamine and sodium carbonate is dependent on the addition of considerable quantities of caustic. Moreover, after the recovery of alkanolamine there remain considerable amounts of waste products such as a sodium carbonate containing solution which still contains certain amounts of the components of the gas washing liquid. Furthermore, the caustic must be brought to reaction with the oxazolidone in nearly stoichiometric proportion. If the amount of caustic added is too low, a lower yield will result; if it is too high, this means a loss of chemicals. During phase separation it is necessary to keep the concentration of caustic within narrow limits. If the concentration is too low, much of the alkanolamine will be lost with the sodium carbonate phase; if it is too high, disturbances will occur due to the deposition of solid sodium carbonate. It is true that the concentration of the caustic can be controlled by means of controlling or dosing devices, but such devices are relatively expensive.

SUMMARY OF THE INVENTION

This invention is directed to a method of producing and recovering alkanolamine from an aqueous liquid mixture containing oxazolidone wherein the oxazolidone is hydrolyzed at elevated temperatures to form the alkanolamine and the alkanolamine is recovered.

BRIEF DESCRIPTION OF THE DRAWINGS

FIG. 4 shows, in longitudinal section, one constructional form of a reactor according to the invention;

FIG. 5 is a cross-section through the reactor illustrated in FIG. 4, along line A—A;

DESCRIPTION OF THE PREFERRED EMBODIMENTS

Figure 1:
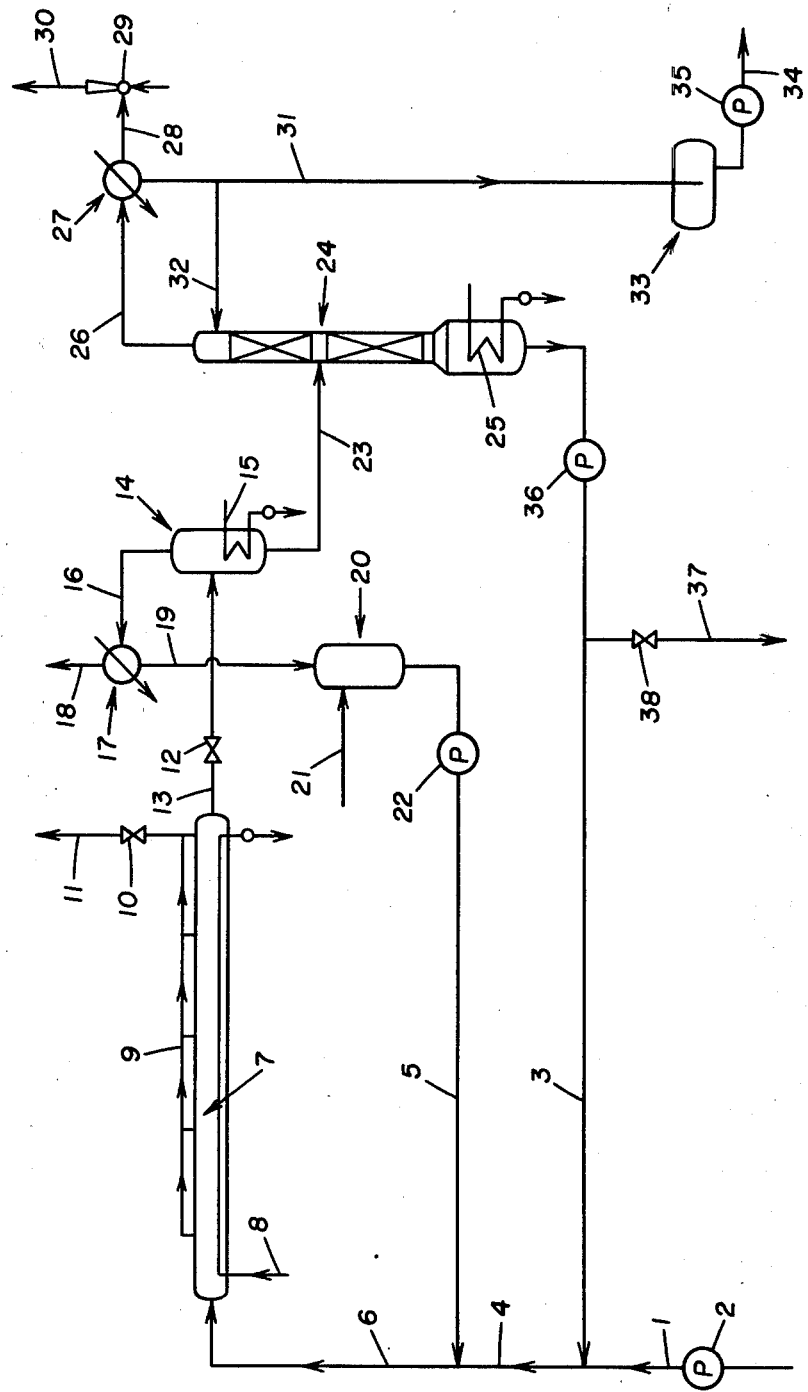
FIG. 1 shows apparatus according to the invention in a schematic representation which serves to illustrate the individual process steps.

This invention is concerned with producing alkanolamine from a mixture containing oxazolidone. For example, it is intended to produce diisopropanolamine from oxazolidone mixtures, as from 3-(2-hydroxypropyl)-5-methyloxazolidone-2. In particular, diisopropanolamine shall be recovered from such oxazolidone derivatives as are formed during the regeneration of absorption solutions which contain diisopropanolamine and are used for the absorption of acidic components from gases.

This is accomplished by a method of the above-mentioned type in that the oxazolidone is hydrolyzed at elevated temperature and the water and the alkanolamine are separated from the hydrolyzed liquid mixture.

The advantage of the method according to the invention mainly resides in the fact that no additional chemicals are required for the recovering of alkanolamine from oxazolidone. Considerably less waste products are obtained with the method according to the invention in comparison to known methods. Carbon dioxide, which is obtained as a waste product with the method according to the invention, can be discharged into the atmosphere. Moreover, the technical requirements for carrying out the process according to the invention are simpler, it being only necessary to provide for the addition of a sufficiently large amount of water.

According to a preferred embodiment of the invention the oxazolidone not yet reacted in the first hydrolysis step can — after enrichment — pass through a second hydrolysis step. By such a succession of hydrolysis steps it is possible to obtain an increased yield of alkanolamine.

According to the method of this invention temperatures to use vary between 140° and 200° C. with residence times of the liquid being hydrolyzed in a reactor of preferably 48 hours, water being preferably added to the oxazolidone in an amount 2.5 times that of the oxazolidone by weight.

According to another feature of the invention the water of the hydrolyzed liquid is separated prior to the separation of alkanolamine and oxazolidone in order that the subsequent separating step can be made as small in capacity as possible. The simplest way of effecting the separation of water is by vaporization at atmospheric pressure.

The process of the invention can be carried out continuously, but it is also possible to operate discontinuously by flowing the oxazolidone into a vessel and heating it therein preferably to 180° C. so that, at a pressure of approximately 10 bars, steam is formed. Then, an outlet for carbon dioxide is opened; in the course of 48 hours about one half of the oxazolidone within the vessel has been converted into alkanolamine. At the end of this period the vessel is opened and the tension is relieved. In the course of the subsequent vaporization, first of all, water evaporates while the temperature in the vessel increases. At a temperature of approximately 110° C. the connection to the atmosphere is closed and a steam injector is set in operation. The alkanolamine and steam mixture now discharged from the vessel is subsequently processed in the manner described above.

An essential advantage of the different variants of the method is that the water used for the hydrolysis can be recovered from the vapor phase after the hydrolysis and reused for hydrolysis.

An apparatus for carrying out the method according to the invention comprises at least one pressure-temperature reactor having an inlet for the oxazolidone-containing mixture diluted with water at one end and an outlet for carbon dioxide and an outlet for the hydrolyzed liquid containing alkanolamine and oxazolidone. Connected at the outlet side of the reactor may be a vaporizer and a separation column or another reactor.

According to a preferred construction of a reactor for carrying out the method according to the invention the reactor is of cylindrical configuration, being provided at one end with an inlet for the liquid to be hydrolyzed and at the other end with an outlet for the hydrolyzed liquid. The substantially horizontally disposed tube includes barrier members distributed over the length of the tube which extend downwardly into the liquid, dividing the interior of the cylinder into a plurality of compartments. Provided at the top of the cylinder at points adjacent to or directly before the dividing members are outlets through which carbon dioxide can escape. By this construction it is possible on the one hand to achieve a long residence time for the liquid to be hydrolyzed and on the other hand to prevent that liquid portions of different residence times can come together. By this measure it is also ensured that the carbon dioxide formed can be led off immediately after its formation and there is hardly any possibility for it to react once more with the liquid to be hydrolyzed.

According to another preferred construction of the reactor according to the invention the reactor includes a plurality of retention chambers arranged above one another. Each individual retention chamber has an inlet at one side and an outlet at the other side, the space between the inlet and the outlet being subdivided in labyrinth fashion by a plurality of baffles.

According to a further preferred construction of a reactor according to the invention the reactor is subdivided into two or more chambers connected into two separate cycles, the chambers being interconnected.

The invention will now be described by way of example with reference to the drawings.

In a washing-agent circulation system in which alkanolamine is used as a solvent as shown in FIG. 1, a partial stream containing the reaction product oxazolidone is conveyed, after enrichment of the oxazolidone, by means of a pump 2 through a line 1 to a system for recovering alkanolamine.

The partial stream on its way to a reactor 7 has admixed thereto, through a line 3, an oxazolidone concentrate that is obtained in the course of the process to be described hereinafter. The mixture flows through a line 4 and is diluted by the addition of water, the water being preferably introduced, via a line 5, in an amount twice the amount of the oxazolidone.

The liquid conditioned in the described manner flows via a line 6 into the reactor 7 where it is heated by a heating means 8 to a temperature of approximately 180° C. The residence time of the liquid in the reactor 7 is at least 48 hours. During this period of time about one half of the oxazolidone is converted into alkanolamine and carbon dioxide, the latter, together with steam, being led off as soon as possible after its formation via a line 9 having several connections to the reactor 7 and discharged into the atmosphere through a pressure-controlled relief valve 10 and via a line 11. The carbon dioxide and steam mixture to be led off contains at least 90 percent by volume of steam in order to reduce the residence time of carbon dioxide. Therefore, the internal pressure of the reactor is adjusted so that at the desired reaction temperature the internal pressure of the reactor 7 will be only slightly higher than the vapor pressure of the reacting liquid.

The hydrolyzed liquid issuing from the reactor is expanded to atmospheric pressure by a valve 12 and flows via a line 13 into a vaporizer 14. The level of liquid in the reactor 7 is maintained constant by controlling the valve 12. The vaporizer 14 includes a heating system 15 by means of which the water in the liquid mixture flowing out of the reactor is reduced to approximately 10 percent by weight. The steam produced in the vaporizer 14 flows via line 16 into a condenser 17 and is liquefied in the condenser 17, the uncondensed residual steam being discharged into the atmosphere via a line 18. The steam condensate flows via a line 19 into a water reservoir 20, the level of water in the reservoir being kept constant by supply of water from a line 21. A pump 22 returns the water via line 5 to the reactor inlet.

The liquid mixture flowing from the vaporizer 14 via a line 23 into a separating column 24 contains substantially alkanolamine and still unreacted oxazolidone. At the top of the separating column 24 an alkanolamine and steam mixture issues via a line 26 while the oxazolidone, which has a higher boiling point, is obtained as a bottom product. Heating means 25 is provided in the lower part of the separating column 24 to provide the heat required by the separating column 24.

In the present example the separating column 24 is a vacuum column. Accordingly, the top product is passed via line 26 into a condenser 27 and liquefied; the uncondensed residual vapor consisting predominantly of water vapor is led via a line 28 to a vapor-jet vacuum pump 29 and forced by the latter via a line 30 into the atmosphere. The liquefied top product flows via a line 31 into a reservoir 33 for alkanolamine. A pump 35 forces the top product into a line 34 which is connected e.g. to a connection for a tank car or a tank. A partial stream of the top product is returned as reflux via a line 32 into the top of the separating column 24.

The bottom product of the separating column 24 contains predominantly oxazolidone which can be returned via line 3 to the reactor 7 and converted therein into alkanolamine as described. A pump 36 is provided to serve as a conveying means. As the bottom product may contain, besides the oxazolidone, also impurities the accumulation of which in the circulation system is not desired, the bottom product can be led off, to the desired extent, through a relief valve 38 via a line 37 connected to line 3, out of the circulation system of the apparatus for recovering alkanolamine according to the invention.

The apparatus described herein illustrates, by way of example only, a possible application of the method according to the invention for the event that enrichment of the oxazolidone is effected before this process or that it is desired to recover alkanolamines from the waste products of a plurality of separate gas washing installations at different locations independently of the gas washing process.

For example, in planning new gas washing installations, it is also possible to dispense with the conventional enrichment of the waste product oxazolidone and to direct a partial stream of solvent directly into apparatus for recovering alkanolamine according to the invention. In that case line 1 falls away and the solvent stream is introduced into line 13.

Also, instead of the shown heating means 8 for heating the reactor 7, heating by contact of the reactor charge with live steam can be provided.

Figure 2:
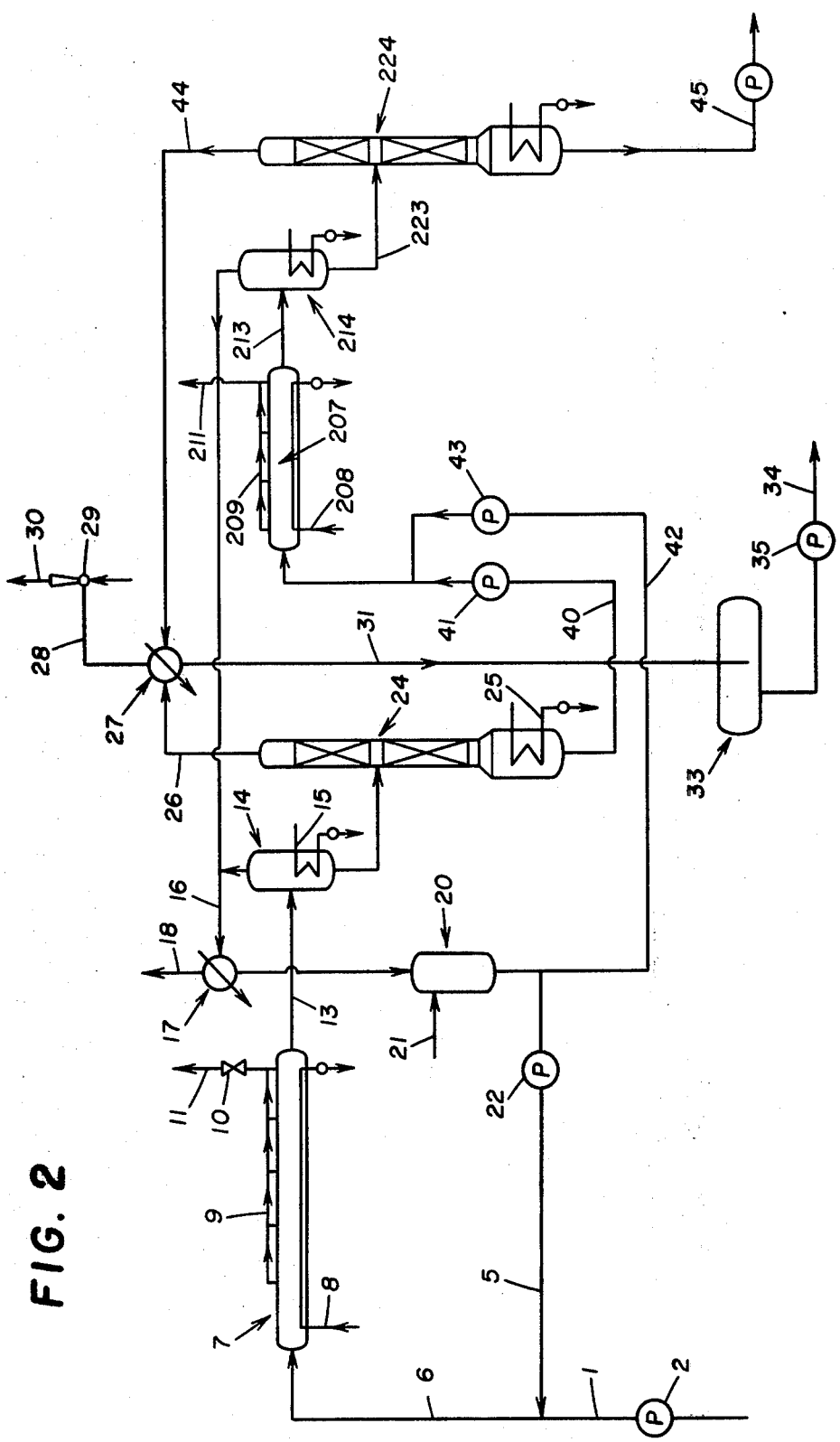
FIG. 2 illustrates schematically an apparatus for continuously recovering alkanolamine from oxazolidone according to the invention.

Referring to FIG. 2, there will now be described a continuously operating method of recovering alkanolamine without recycling of oxazolidone; in this description, the parts corresponding to parts of the apparatus according to FIG. 1 are designated by the same reference numerals.

The reactor 7 is heated by steam so that a temperature of approximately 180° C. is obtained. The rated liquid volume V in cubic meters (in $m^3$) of the reactor is such that a residence time T of 48 hours results for the mixture L flowing therethrough in cubic meters per hour (in $m^3/h$). Thus, the liquid volume is $V = L.T$. During the residence time approximately 50 percent of the oxazolidone is converted into alkanolamine, carbon dioxide being formed in the process and this carbon dioxide being led off from the reactor 7 via line 11 with steam in an amount more than ten times that of the carbon dioxide. That means that the internal pressure of the reactor, at 11 bars, may, at a maximum, be 10 percent higher than the vapor pressure of the liquid mixture which, at a temperature of 180° C., is 10 bars. On the other hand, the internal pressure of the reactor should not be so close to the vapor pressure of the liquid mixture as to cause that the amount of steam carried off with the carbon dioxide will be more than 50 times that of the carbon dioxide. The desired internal pressure of the reactor 7 can be kept constant by control means.

The oxazolidone and water mixture is so conducted in the reactor that there will practically be no mixing of liquid zones of different residence times as is the case e.g. with a pipe of great length relative to the diameter. The liquid flowing out of the reactor 7 via line 13 contains more than 60 percent by weight of water. This water content is reduced in the vaporizer 14 to approximately 10 percent by weight without simultaneous vaporization of substantial amounts of alkanolamine. Only with a lower water content will the vaporization of alkanolamine, and also the boiling temperature, rise substantially. As the vaporization heat of water based on 1 kilogram is a multiple of the vaporization heat of alkanolamines based on 1 kilogram, it is expedient to vaporize most of the water in the vaporizer 14 at atmospheric pressure and at relatively low boiling temperatures (approximately 110° C.) and only as little of the water as possible in the separation column 24 at a boiling temperature of 180° C. as adjusted in the sump of the separation column 24. From the lower part of the separation column 24 the liquid containing oxazolidone is flowed by means of a pump 41 via a line 40 into a second reactor 207 which substantially corresponds in its structure and mode of operation to the first reactor 7. Here, too, as in the feeding of liquid containing oxazolidone to the first reactor, water is added, the water in this case being supplied from the reservoir 20 via a line 42 and by a pump 43. The second reactor 207 includes heating means 208, a line 209 having a plurality of connections for leading off carbon dioxide, a line 211 via which the carbon dioxide escapes into the atmosphere, and a line 213 to direct the hydrolyzed liquid into a second vaporizer 214. The steam produced in the vaporizer 214 flows via a line 16 and the steam produced in the vaporizer 14 is combined therewith and flows into the condenser 17. From the reactor 207 a liquid predominantly containing alkanolamine is flowed via a line 223 to a second separation column 224. The top product of the separation column is flowed via a line 44 to the condenser 27 and from there it is flowed into the reservoir 33 for alkanolamine as described in connection with FIG. 1. The bottom product of the separation column 224 is led off via a line 45.

Due to the two-step separation of water and alkanolamine from oxazolidone the required heating surface can be reduced to 40 to 10 percent of what would be required for one-step vaporization. Moreover, in the cooler of the condenser 17 there is formed a water condensate which can be utilized for diluting the oxazolidone.

The separation column 24 is designed as a vacuum column with the condenser 27 and the multistep vapor injector 29. However, a vacuum is not required if a stripping medium (such as steam) is passed through the column at atmospheric pressure.

Figure 3:
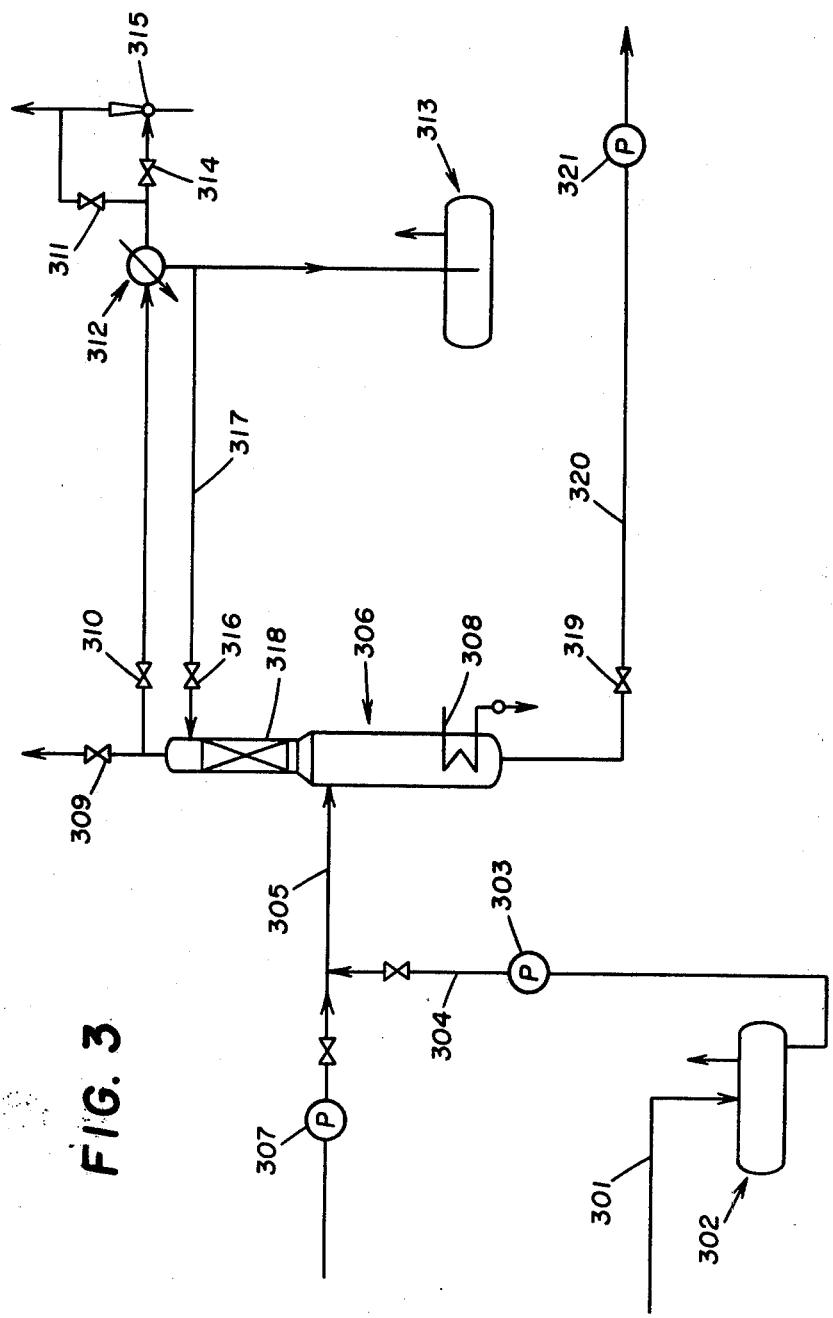
FIG. 3 shows an apparatus for discontinuously recovering alkanolamine from oxazolidone according to the invention.

Referring to FIG. 3, there will now be described a discontinuously operating method of recovering alkanolamine from oxazolidone.

An oxazolidone concentrate is flowed via a line 301 into a tank 302 and collected there. If the tank 302 is filled, its content is delivered by means of a pump 303 via lines 304 and 305 into a multipurpose tank 306. Subsequently, water is fed into the tank 306 via line 305 by means of a pump 307. In the next process step the contents of the tank 306 is heated by a heating means 308 to a temperature of 180° C. so that, at a pressure of approximately 10 bars, steam is developed while the tank 306 is closed off externally. A valve 309 is opened to permit carbon dioxide to escape together with a predetermined amount of steam. About one half of the introduced oxazolidone is converted under these conditions into alkanolamine in the course of about 48 hours.

Upon the lapse of 48 hours the tank 306 is relieved of pressure by opening valves 310 and 311 while valve 309 is closed. At this time the phase of the evaporation of water from the contents of the tank 306 begins. For this the heating means 308 remains in operation and a condenser 312 is set in operation. The uncondensed residual steam is released into the atmosphere through valve 311 while the condensate is collected in a tank 313. The temperature in the tank 306 increases in accordance with the decrease in the water content and the vaporized amount of alkanolamine increases in the course of time. When a temperature of approximately 140° C. is reached, there begins a phase of predominant alkanolamine vaporization. Therefore, the valve 311 is closed, a valve 314 is opened, and a vapor injector 315 is set in operation. A valve 316 is opened and a portion of the condensate is returned as reflux via a line 317 into a separation column 318 on top of the tank 306. Here the oxazolidone vaporized with the water is washed out of the rising vapor. Oxazolidone is accumulated in the sump.

When the desired residual content of alkanolamine in the sump of the tank 306 is attained, the heating means 308 and the vapor injector 315 are switched off and the valve 311 is opened. If a recovery of alkanolamine of approximately 50 percent is desired, the residue in the tank 306 consisting substantially of oxazolidone is flowed, after the opening of a valve 319, via a line 320 e.g. into a residue collecting tank (not shown) by means of a pump 321.

The recovery of alkanolamine can be increased to approximately 75 percent if the residue is once more subjected to the described procedure and only the second residue is led off as waste.

In FIG. 4, there is shown a reactor 401 for use with the invention, the main components of this reactor being a pipe and a heating coil 402 disposed therein. This reactor design comes into question e.g. if, in order to save space, it is intended to install the reactor on an existing pipe supporting bridge. It is of course possible to arrange a plurality of individual reactors of the described construction in series connection.

The liquid mixture to be hydrolyzed is introduced into the reactor 401 through a short tube 403 serving as an opening and the hydrolyzed liquid leaves the reactor through a short tube 407. Steam for heating is introduced into the heating coil 402 through a short tube 404, its condensate flowing off through a short tube 405. The heating coil 402 is supported e.g. by welded sheet metal parts 408. The upper zone of the pipe of reactor 401 which is free from liquid is subdivided into individual sections by sheet metal parts 409 projecting into said zone; the carbon dioxide formed during the hydrolysis can escape, together with steam, from said sections or compartments through short tubes 406.

FIG. 5 shows the reactor 401 in cross-sectional view in which a supporting sheet metal part 408, a subdividing sheet-metal part 409 and a short tube 406 can be recognized.

Figure 6:
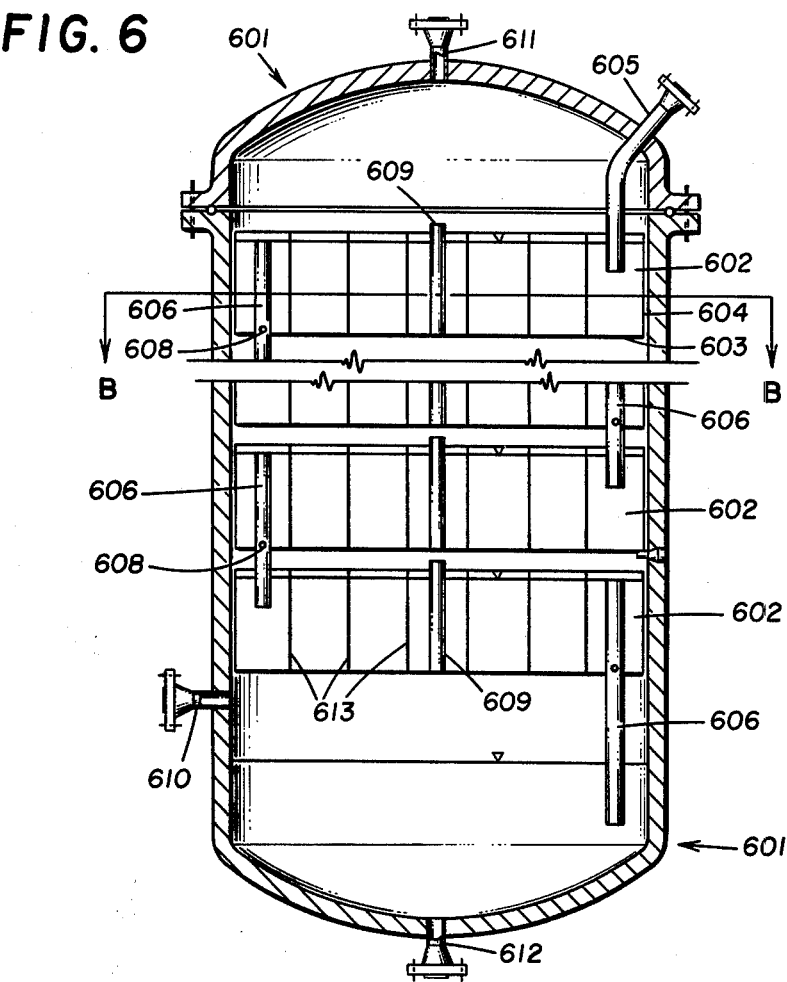
FIG. 6 shows a longitudinal section through another constructional form of a reactor according to the invention.
Figure 7:
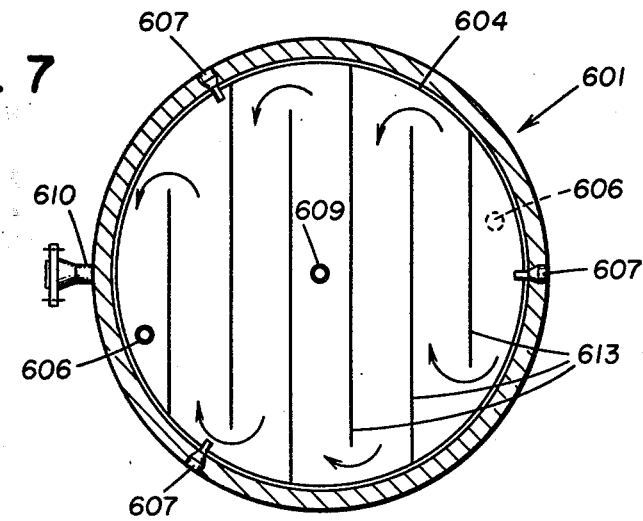
FIG. 7 shows a cross-section through the reactor illustrated in FIG. 6, along line B—B.

FIGS. 6 and 7 show a modified reactor which comprises a pressure tank 601 having a plurality of retention chambers 602 arranged above one another for retaining the liquid mixture to be hydrolyzed. Each retention chamber 602 is formed of a circular sheet-metal plate 603 and a cylindrical sheet-metal part 604 welded to the edge thereof. The liquid to be hydrolyzed is introduced into the respective retention chamber through a feed pipe 605 or through an overflow tube 606 of the next higher retention chamber and is guided in the respective retention chamber by means of vertical sheet-metal plates 613 so as to prevent any mixing of liquid zones of different residence times on the way of the liquid up to the overflow pipe 606 of the retention chamber. The vertical sheet-metal plates 613 serve also to stiffen the circular sheet-metal plate 603.

Each retention chamber 602 is supported by at least three cams or projecting parts 607 which can be screwed into the shell of the tank 601 and removed therefrom, if necessary. The overflow tubes 606 are immersed into the next lower liquid level and have openings 608 closely above the circular plates 603 through which partial liquid streams can flow off. These openings 608 permit emptying of the retention chambers 602, if necessary. Steam is introduced into the reactor via a short tube 610; this steam — insofar as it is not used — is led off, together with the carbon dioxide formed during the hydrolysis, through the tubes 609 and out from a short pipe 611. The hydrolyzed liquid mixture leaves the reactor via a short tube 612.

In the methods and apparatus described heretofore it was assumed that there shall not occur in the reactor any mixing of zones having different residence times because in that case the lowest possible liquid volume is obtained for the reactor for a given residence time. But this condition requires a special design of the reactor and its installations because depositions might form on the inner walls of the reactor and because the inner walls of the pressure tank, and particularly the welding seams of the installations, must be accessible for inspection. For this reason the installations must be detachable.

It may therefore be advantageous to allow a mingling of the contents of the reactor and, thus, to dispense with all installations in the tank.

Figure 8:
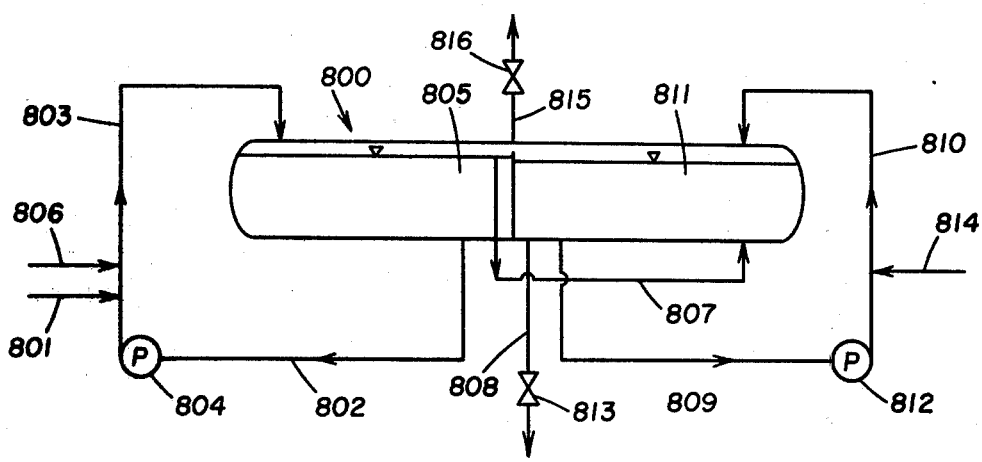
FIG. 8 is a schematic representation of a reactor according to the invention.

An example for such a method will now be described by reference to FIG. 8. The oxazolidone to be hydrolyzed flows via a line 801 into a circulation system for an oxazolidone and alkanolamine mixture which consists of lines 802 and 803, a pump 804, and a first reactor chamber 805 and into which steam is introduced via a line 806 to provide the required heat and to strip off carbon dioxide. In this case the hydrolysis takes place at an almost constant oxazolidone concentration.

A partial stream is flowed from the first reactor chamber 805 of a reactor 800 via a line 807 into a second reactor chamber 811 the contents of which is conveyed in a cycle via lines 809 and 810 by means of a pump 812. Steam is supplied to this cycle via line 814 to provide the required heat and to strip off carbon dioxide. The carbon dioxide formed during the hydrolysis in the reactor chambers 805 and 811 passes via a line 815 through a pressure holding valve 816 into the atmosphere. A portion of the liquid mixture is led off from the reactor chamber 811 via a line 808 and a level-controlled valve 813 for further processing.

Figure 9:
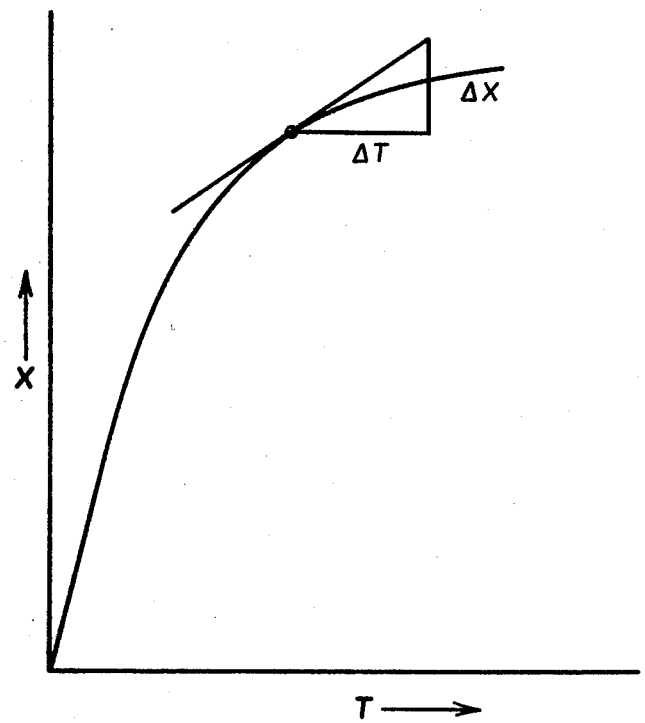
FIG. 9 is a graphic representation of the oxazolidone conversion x as a function of the residence time T in a reactor.

In order to be able to control such a process the dependence of the oxazolidone conversion x on the residence time T must be known. This dependence must be measured during a continuously increasing oxazolidone conversion as is possible e.g. by using the reactor shown in FIGS. 3 and 4, and this must be done for a predetermined reaction temperature and for a predetermined water content of the reactor charge (see FIG. 9). Then, for an inflow quantity $L_{oi}$ and for the reactor shown in FIG. 6 the filling volumes $V_i$ of the reactor chambers result from the relationship $V_i = (x_i \cdot L_i - x_{oi} \cdot L_{oi})/(\Delta x/\Delta T)_i$, which can also be used for optimization of the number of such reactor chambers. From this relationship follows also the mean residence time $T_m = V/L$ of the liquid mixtures within such reactor chambers.

Therein $x_i$ is the total oxazolidone conversion for the outflow from reactor chamber i, $x_{oi}$ is the total oxazolidone conversion for the inflow to the reactor chamber i, $L_i$ is the quantity of outflow from the reactor chamber i, L is the quantity of flow through the reactor, not constant.

In case of direct heating the quantity of inflow $L_{oi}$ differs from the quantity of outflow $L_i$ by the absorption of steam condensate in the reactor. Therefore, L is a mean value.

We claim:

1. A method of recovering diisopropanolamine from a mixture containing an oxazolidone derivative of diisopropanolamine, comprising the steps of:
   (a) adding water to said mixture containing an oxazolidone derivative;
   (b) heating said mixture containing an oxazolidone derivative and water to an elevated temperature to hydrolyze said mixture containing an oxazolidone derivative and form from a portion thereof diisopropanolamine and leave a residue mixture containing unhydrolyzed oxazolidone derivative of diisopropanolamine;
   (c) separating said diisopropanolamine from said residue mixture; and
   (d) recovering said diisopropanolamine.

2. The method of claim 1 further comprising,
   adding water to said residue mixture containing oxazolidone, and
   repeating at least once said steps (b), (c), and (d).

3. The method of claim 1 wherein in step (a) water is added in an amount by weight within the range of 1 to 4 times the weight of said oxazolidone.

4. The method of claim 3 wherein in step (b) said mixture of oxazolidone and water is heated to a temperature within the range of from about 140° C. to 200° C., at a pressure corresponding to the vapor pressure at said corresponding temperature, and for a time of at least 24 hours.

5. The method of claim 4 wherein said mixture is heated at a pressure corresponding to 3 to 10 percent greater than the vapor pressure at said corresponding temperature.

6. A method of recovering diisopropanolamine from a mixture containing an oxazolidone derivative of diisopropanolamine, comprising the steps of:
   (a) adding water to said mixture containing an oxazolidone derivative, said water being added in an amount of about 2.5 times the weight of said oxazolidone derivative;
   (b) heating said mixture containing an oxazolidone derivative and water to a temperature of about 180° C. at a pressure corresponding to the vapor pressure at 180° C. of said mixture of an oxazolidone derivative and water for a time period of about 48 hours to hydrolyze said mixture containing an oxazolidone derivative and form from a portion thereof diisopropanolamine and leave a residue mixture containing unhydrolyzed oxazolidone derivative of diisopropanolamine;
   (c) separating said diisopropanolamine from said residue mixture; and
   (d) recovering said diisopropanolamine.

7. The method of claim 6 further comprising,
   adding water to said residue mixture containing oxazolidone, said water being added in an amount within the range of 1 to 4 times the weight of said oxazolidone.

8. The method of claim 7 further comprising,
   prior to step (c) separating said water of said hydrolyzed mixture prior to separating said alkanolamine from said residue mixture containing oxazolidone.

9. The method of claim 8 further comprising,
   separating said water of said hydrolyzed mixture by vaporization at atmospheric pressure.

10. The method of claim 6 wherein in step (b) said mixture is heated at a pressure corresponding to about 3 to 10 percent greater than the vapor pressure at 180° C. of said mixture.

11. In a method of separating acidic gases from a gaseous mixture by contacting the gaseous mixture with an absorption solution containing an alkanolamine, and wherein the absorption solution is regenerated and recovered and a residue remains containing a stable reaction product formed from at least a portion of said alkanolamine, the improvement comprising:
   (a) mixing said residue containing a stable reaction product with at least an equal amount by weight of water;
   (b) heating said mixture of water and residue containing a stable reaction product to a temperature of at least 120° C. for a time of at least 2 days to hydrolyze said stable reaction product and form said alkanolamine; and
   (c) recovering said alkanolamine for reuse in said absorption solution.

12. In a method of separating acidic gases from a gaseous mixture by contacting the gaseous mixture with an absorption solution containing an alkanolamine, and wherein the absorption solution is regenerated and recovered and a residue remains containing an oxazolidone derivative of the alkanolamine formed from at least a portion of said alkanolamine, the improvement comprising:
   (a) mixing said residue containing said oxazolidone derivative with 1 to 4 parts of water by weight;
   (b) heating said mixture to a temperature within the range of about 140° C. to 200° C. for a period of about 1 to 4 days to hydrolyze said oxazolidone derivative and form alkanolamine and carbon dioxide;
   (c) distilling said mixture; and
   (d) recovering a distillation product containing said alkanolamine and a distillation residue containing a portion of said oxazolidone derivative.

13. The method of claim 12 wherein said residue containing an oxazolidone derivative is mixed with about 2 parts by weight of water and heated to a temperature of about 180° C. for about 2 days to hydrolyze said oxazolidone derivative.

14. The method of claim 13 further comprising, prior to step (a), distilling said residue to enrich said oxazolidone derivative.

15. The method of claim 12 further comprising recovering said distillation residue of step (d); and repeating steps (a), (b), (c), and (d) to recover additional product containing alkanolamine.

16. The method of claim 12 wherein said alkanolamine is diisopropanolamine and said oxazolidone derivative is derived from diisopropanolamine.

17. The method of claim 16 wherein said oxazolidone derivative is 3-(2-hydroxypropyl)-5-methyloxazolidone-2.

* * * * *